United States Patent
Kim et al.

(10) Patent No.: US 7,492,667 B2
(45) Date of Patent: Feb. 17, 2009

(54) LOCATION RECOGNITION SYSTEM USING STEREOPHONIC SOUND, TRANSMITTER AND RECEIVER THEREIN, AND METHOD THEREOF

(75) Inventors: Min-Q Kim, Seoul (KR); Min-seop Jeong, Seoul (KR); Heung-soo Kim, Ansan-si (KR); Byoung-joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 11/442,533

(22) Filed: May 30, 2006

(65) Prior Publication Data

US 2007/0037583 A1  Feb. 15, 2007

(30) Foreign Application Priority Data

Jul. 26, 2005  (KR) ............ 10-2005-0068105

(51) Int. Cl.
 G01S 5/14 (2006.01)
 G08B 25/10 (2006.01)
(52) U.S. Cl. .................... 367/116
(58) Field of Classification Search ........ 367/116, 367/118, 906
 See application file for complete search history.

(56) References Cited

U.S. PATENT DOCUMENTS 4,967,641 A * 11/1990 Chambre ............ 367/116
5,241,518 A * 8/1993 McNelis et al. ........ 367/906
2003/0223602 A1   12/2003 Eichler et al.
2007/0037583 A1 * 2/2007 Kim et al. ........... 455/456.1

FOREIGN PATENT DOCUMENTS

| EP | 1 296 155 A1 | 3/2003 |
| EP | 1748302 A2 * | 1/2007 |
| JP | 2007035043 A * | 2/2007 |
| WO | WO 02/067007 A1 | 8/2002 |

* cited by examiner

*Primary Examiner*—Dan Pihulic
(74) *Attorney, Agent, or Firm*—Sughrue Mion, PLLC

(57) ABSTRACT

A location recognition system and method using stereophonic sound, the system having a transmitter and a receiver. The transmitter uses the stereophonic sound and transmits location tracking information of an object. The transmitter includes a sound detector which detects a sound of the object and converts the detected sound to an electrical signal; a data converter which converts the electrical signal converted by the sound detector, to acoustic data; and a first communication interface which transmits the acoustic data converted by the data converter and the location tracking information to the receiver. A user can immediately recognize the location of the transmitter which transmits the location tracking information and is the target of the location tracking. Therefore, the mutual communications between the transmitter and the receiver which receives the location tracking information can be smoothly carried out.

22 Claims, 4 Drawing Sheets

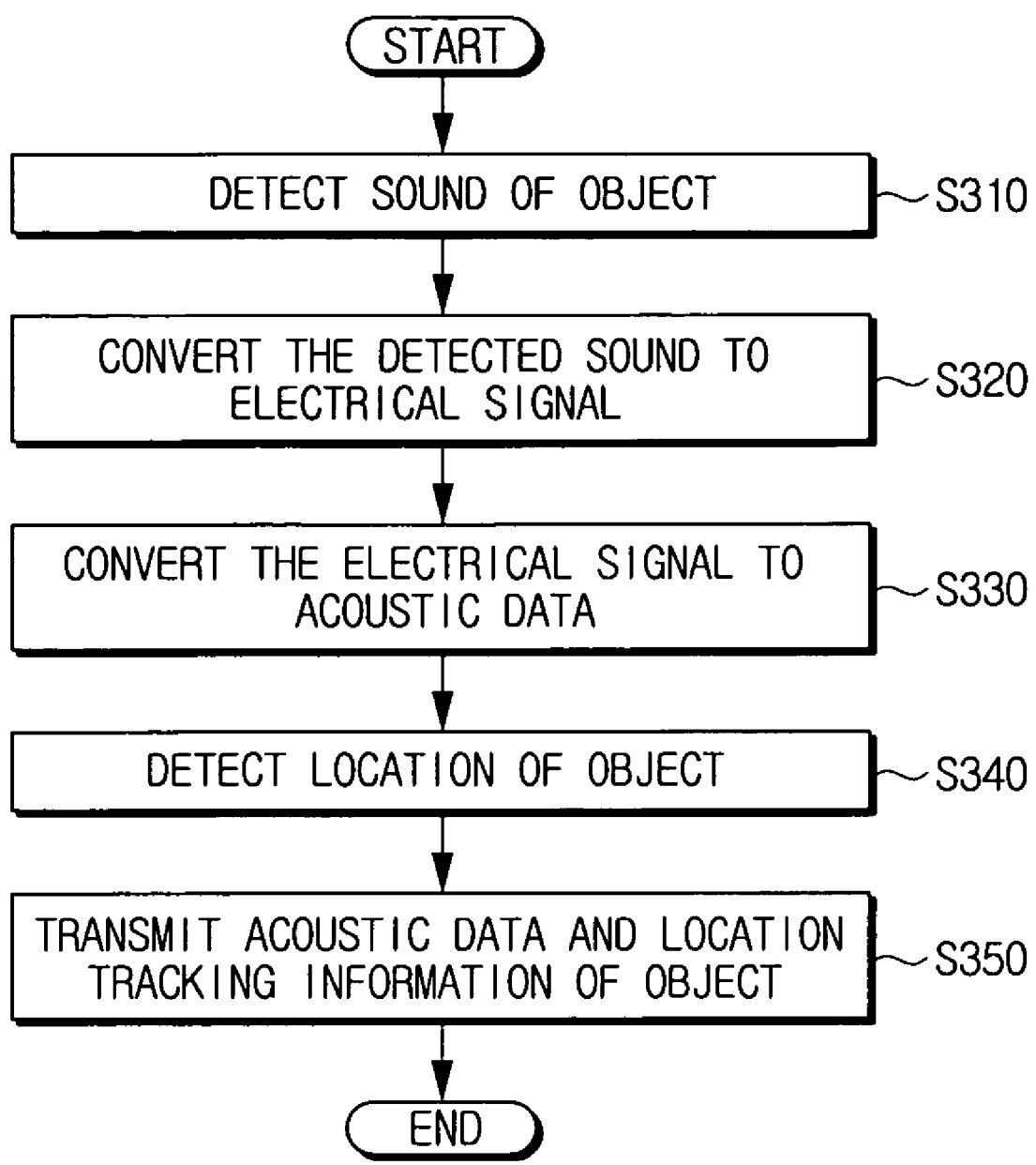

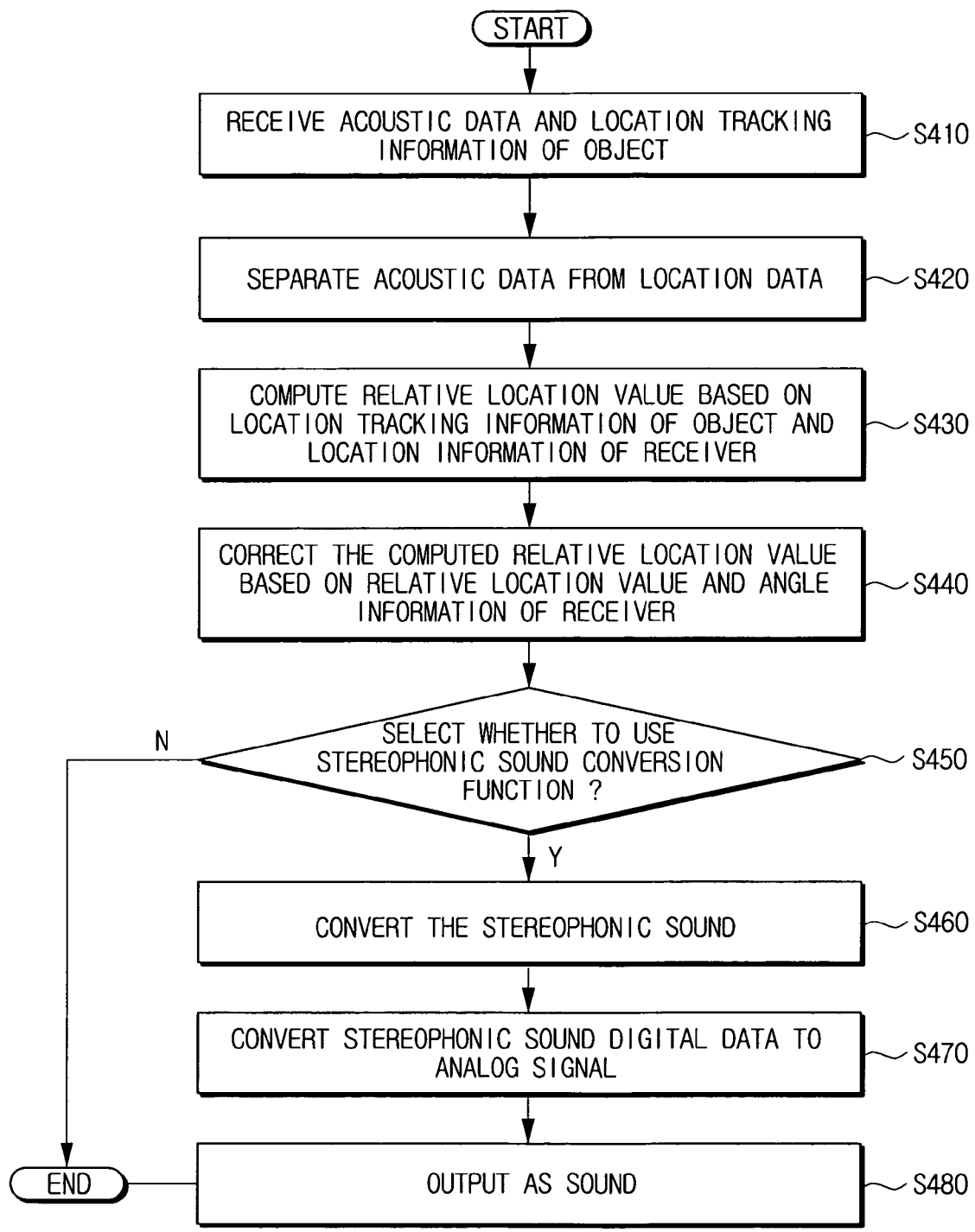

LOCATION RECOGNITION SYSTEM USING STEREOPHONIC SOUND, TRANSMITTER AND RECEIVER THEREIN, AND METHOD THEREOF

CROSS-REFERENCE TO RELATED APPLICATIONS

This application claims priority under 35 U.S.C. § 119(a) from Korean Patent Application No. 2005-68105 filed on Jul. 26, 2005 in the Korean Intellectual Property Office, the entire disclosure of which is incorporated herein by reference.

BACKGROUND OF THE INVENTION

1. Field of the Invention

Methods, apparatuses and systems consistent with the present invention relate to location recognition using a stereophonic sound, transmission and reception. More particularly, the present invention relates to a location recognition system using stereophonic sound and including a transmitter which transmits location tracking information of an object and a receiver which receives the location tracking information, and a method thereof.

2. Description of the Related Art

General location recognition methods include a method which uses a current location or a movement direction of a user provided from a satellite via a radio wave, or a method which detects the user's location by measuring and computing the movement distance or direction.

Such methods determine specific geographical information around the current location using a compact disk read only memory (CD-ROM) which stores whole geographical information, marks the current location and displays a map image on a display screen so that a location corresponding to the detected current location is indicated on the map. The user determines his or her path based on the actual circumstances in reference to the display screen and marks the path to a destination so that the user can be guided to the destination.

Recent navigation systems can not only display crossroads and the like on the display screen but also make a sound so that the user can perceive the circumstances. Thus, the user can determine his or her path without having to looking at the display screen all the time. Such a scheme can be applied to help sight-impaired people to walk around.

The object tracking scheme is applicable to various situations as well as to guide sight-impaired people. For example, the object tracking scheme is useful when a user wants to know the accurate location of a person for mutual communication or a target object in a crowded area.

However, the scheme to display the location of the object on the screen may cause inconvenience to the user because the user has to look at the screen carefully.

The scheme which makes a sound to inform the location information of the object can mitigate the burden from the user, but cannot induce the user to immediately select the next path because it takes time for the user to hear the sound relating to the location information and to estimate the perceived location information.

SUMMARY OF THE INVENTION

An aspect of the present invention provides a location recognition system using stereophonic sound for smooth communication between a transmitter which transmits location tracking information of an object and a receiver which receives the location tracking information so that a user can immediately recognize a location of the transmitter. Also provided are the transmitter and the receiver in the location recognition system, and a location recognition method.

A transmitter in a location recognition system which uses a stereophonic sound and includes the transmitter transmitting location tracking information of an object and a receiver receiving the location tracking information, includes a sound detector which detects a sound of the object and converts the detected sound to an electrical signal; a data converter which converts the electrical signal converted by the sound detector, to acoustic data; and a first communication interface which transmits the acoustic data converted by the data converter and the location tracking information to the receiver.

The transmitter may be attached to the object or placed in the vicinity of the object.

The transmitter may further include a first location tracker which detects a location of the transmitter and generates the location tracking information of the transmitter.

The sound detector may detect a sound generated by the object and convert the detected sound to an electrical signal.

The sound detector may create a sound indicating the object and convert the created sound to an electrical signal.

The sound detector may be a microphone.

A receiver in a location recognition system which uses stereophonic sound and includes a transmitter transmitting location tracking information of an object and the receiver receiving the location tracking information, includes a location and state tracker which generates location information of the receiver by detecting a location of the receiver; a relative location calculator which computes a relative location and state value of the receiver with respect to the transmitter based on the location information generated by the location and state tracker; a stereophonic sound converter which converts acoustic data to stereophonic sound digital data to inform the location of the transmitter based on the relative location and state value computed by the relative location calculator; an analog converter which converts the stereophonic sound digital data converted by the stereophonic sound converter, to an analog signal; and a sound output section which outputs the analog signal converted by the analog converter as a sound.

The receiver may be attached to a user or placed in the vicinity of the user.

The location and state tracker may include a second location tracker which generates location information of the receiver by detecting a location of the receiver; and a state tracker which generates angle information of the receiver with respect to the transmitter.

The relative location calculator may include a first calculator which computes a relative location value of the receiver with respect to the transmitter based on the location tracking information relating to the transmitter generated by a first location tracker and the location information relating to the receiver generated by the second location tracker; and a second calculator which corrects the relative location value computed by the first calculator based on the relative location value computed by the first calculator and the angle information generated by the state tracker.

The first calculator may compute coordinates (x, y, z) which is the relative location value of the receiver, in a three-dimensional coordinate system having an origin (0, 0, 0) as the transmitter.

The second calculator may correct the relative location value when the transmitter and the receiver face each other and an angle between the transmitter and the receiver changes.

The stereophonic sound converter may convert the acoustic data received from a first communication interface by applying the relative location and state value.

The stereophonic sound digital data converted by the stereophonic sound converter may be surround stereophonic sound digital data.

The receiver may further include a second communication interface which receives the acoustic data and the location tracking information from the first communication interface.

The receiver may further include a selector which selects whether to convert the received acoustic data to the stereophonic sound digital data.

A location recognition system using stereophonic sound includes a transmitter which transmits location tracking information of an object; and a receiver which receives the location tracking information. The transmitter includes a sound detector which detects a sound of the object and converts the detected sound to an electrical signal; a data converter which converts the electrical signal converted by the sound detector, to acoustic data; and a first communication interface which transmits the acoustic data converted by the data converter and the location tracking information to the receiver.

The receiver may include a location and state tracker which generates location information of the receiver by detecting a location of the receiver; a relative location calculator which computes a relative location and state value of the receiver with respect to the transmitter based on the location information generated by the location and state tracker; a stereophonic sound converter which converts the acoustic data to stereophonic sound digital data to inform the location of the transmitter based on the relative location and state value computed by the relative location calculator; an analog converter which converts the stereophonic sound digital data converted by the stereophonic sound converter, to an analog signal; and a sound output section which outputs the analog signal converted by the analog converter as a sound.

A location recognition method using stereophonic sound includes transmitting location tracking information of an object; and receiving the location tracking information. The transmitting of the location tracking information includes detecting a sound of the object and converting the detected sound to an electrical signal; converting the converted electrical signal to acoustic data; and transmitting the converted acoustic data and the location tracking information.

The transmitting of the location tracking information may further include generating the location tracking information by detecting a location of the object.

The receiving of the location tracking information may include receiving the acoustic data and the location tracking information of the object; separating into data relating to the sound and data relating to the location information; computing a relative location value of a receiver with respect to the object based on the location tracking information of the object and information of the receiver which receives the location tracking information; correcting the relative location value based on the relative location value and angle information of the receiver; converting the acoustic data to stereophonic sound digital data based on the corrected relative location value; converting the converted stereophonic sound digital data to an analog signal; and outputting the converted analog signal as a sound.

The receiving of the location tracking information may further include selecting a function which converts the received acoustic data to the stereophonic sound digital data.

BRIEF DESCRIPTION OF THE DRAWING FIGURES

These and/or other aspects and advantages of the invention will become apparent and more readily appreciated from the following description of exemplary, non-limiting embodiments, taken in conjunction with the accompanying drawing figures of which:

FIG. 3 is a flowchart outlining a transmission operation of a location recognition method using the stereophonic sound according to a non-limiting embodiment of the present invention; and FIG. 4 is a flowchart outlining a reception operation of a location recognition method using the stereophonic sound according to a non-limiting embodiment of the present invention.

DETAILED DESCRIPTION OF THE EMBODIMENTS

Figure 1:
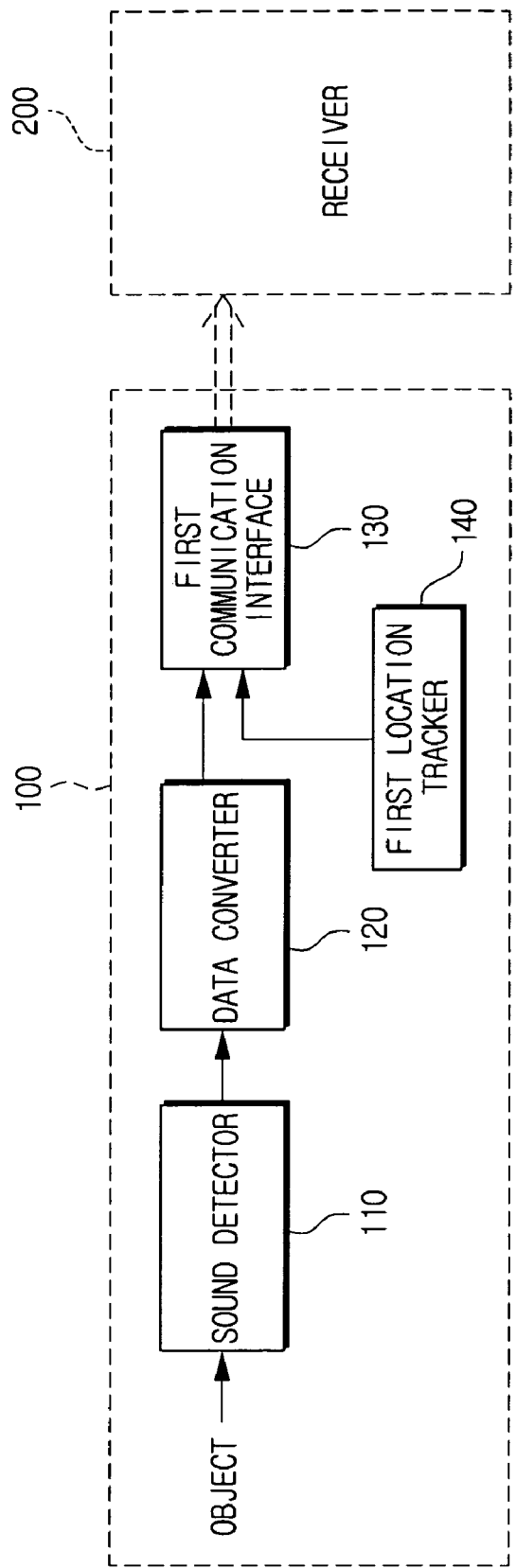
FIG. 1 is a block diagram of a transmitter of a location recognition system using stereophonic sound according to a non-limiting embodiment of the present invention.

Certain exemplary, non-limiting embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 is a block diagram of a transmitter of a location recognition system using stereophonic sound according to a non-limiting embodiment of the present invention.

Referring first to FIG. 1, the location recognition system includes a transmitter 100 and a receiver 200. The transmitter 100 includes a sound detector 110, a data converter 120, a first communication interface 130, and a first location tracker 140.

The transmitter 100 is attached to an object which is the target of the location tracking, or is placed in the vicinity of the object. The transmitter 100 is responsible to transmit a sound reproduced by the object toward the receiver 200. Examples of the transmitter 100 include portable terminal devices having a microphone therein.

The sound detector 110 detects the sound of the object and converts the detected sound into an electrical signal. By way of example, a microphone may be applied to the sound detector 110.

The microphone converts a sound wave or an ultrasonic wave into an electrical signal according to its vibrations. The microphone has an element therein which vibrates by the sound wave and converts the mechanical vibration to the electrical signal within a casing formed suitable to receive the sound wave. The microphone may have an integrated circuit (IC) amplifier which is miniaturized, and a battery for supplying power to the IC amplifier.

The sound detector 110 detects the sound reproduced by the object and converts the detected sound to the electrical signal. Herein, the sound reproduced by the object denotes a unique sound when the object is a living being who can reproduce a sound. When the sound of the object is detected and output as a stereophonic sound, users can perform smooth communication with one another in a crowded or congested area. For example, the stereophonic sound can be effectively utilized in military applications to acquire the location of the friendly force on the battlefield.

In contrast, when the object is not a living being and is incapable of reproducing a sound by itself, the sound detector 110 may create a certain sound indicating the object and convert the created sound to the electrical signal.

The sound indicating the object may be a certain acoustic sound representing the object. For example, such a sound can be a voice stating, 'Exit is this way,' when it is hard to find an exit in the congested area. When the sound is generated and output as a stereophonic sound, it is possible to help the user to easily find its path in a crowded area such as airports.

The data converter 120 converts the electrical signal which is output from the sound detector 110, to acoustic data. The electrical signal is converted to the acoustic data by use of various data stored in a memory (not shown).

The first communication interface 130 is responsible to interface with the receiver 200. The first communication interface 130 transmits the acoustic data converted by the data converter 120, and location tracking information generated by the first location tracker 140, to the receiver 200 (to be explained later).

The first location tracker 140 detects a location of the transmitter 100 and generates the location tracking information of the object. To detect the location of the transmitter 100, the first location tracker 140 requires certain means to detect the location of the object. For example, the location of the transmitter 100 can be detected using a location sensor which receives, from global positioning system (GPS) satellites, the location tracking information of the transmitter 100.

The GPS is a location identification system using satellite communications. The GPS consists of four or five satellites in each of six orbital planes which are inclined at about 55 degrees with respect to the equatorial plane. The GPS allows communications with more than four satellites anywhere on the earth. The GPS receives signals containing specific codes from the GPS satellites and computes its current position (longitude, latitude and altitude) and time at a certain time point. Moreover, when moving around, the GPS can measure its speed.

The GPS, which was originally developed for military purposes, is applied to diverse applications such as simple location information service, auto navigation and traffic control of airplanes, ships and automobiles, collision prevent of oil tankers, and so on. Additionally, the GPS is actively utilized in fields such as emergency services, traffic information, distribution, delivery and so on.

According to a non-limiting embodiment of the present invention, the transmitter 100 may be a mobile device of wide range which can be equipped with location tracking means such as GPS, including digital cameras, video cameras, cellular phones, personal communication services (PCSs), personal digital assistants (PDAs) and the like.

The first communication interface 130 converts the location tracking information of the transmitter 110, which is generated by the first location tracker 140, to data in the form of a file and transmits the data to the receiver 200.

Figure 2:
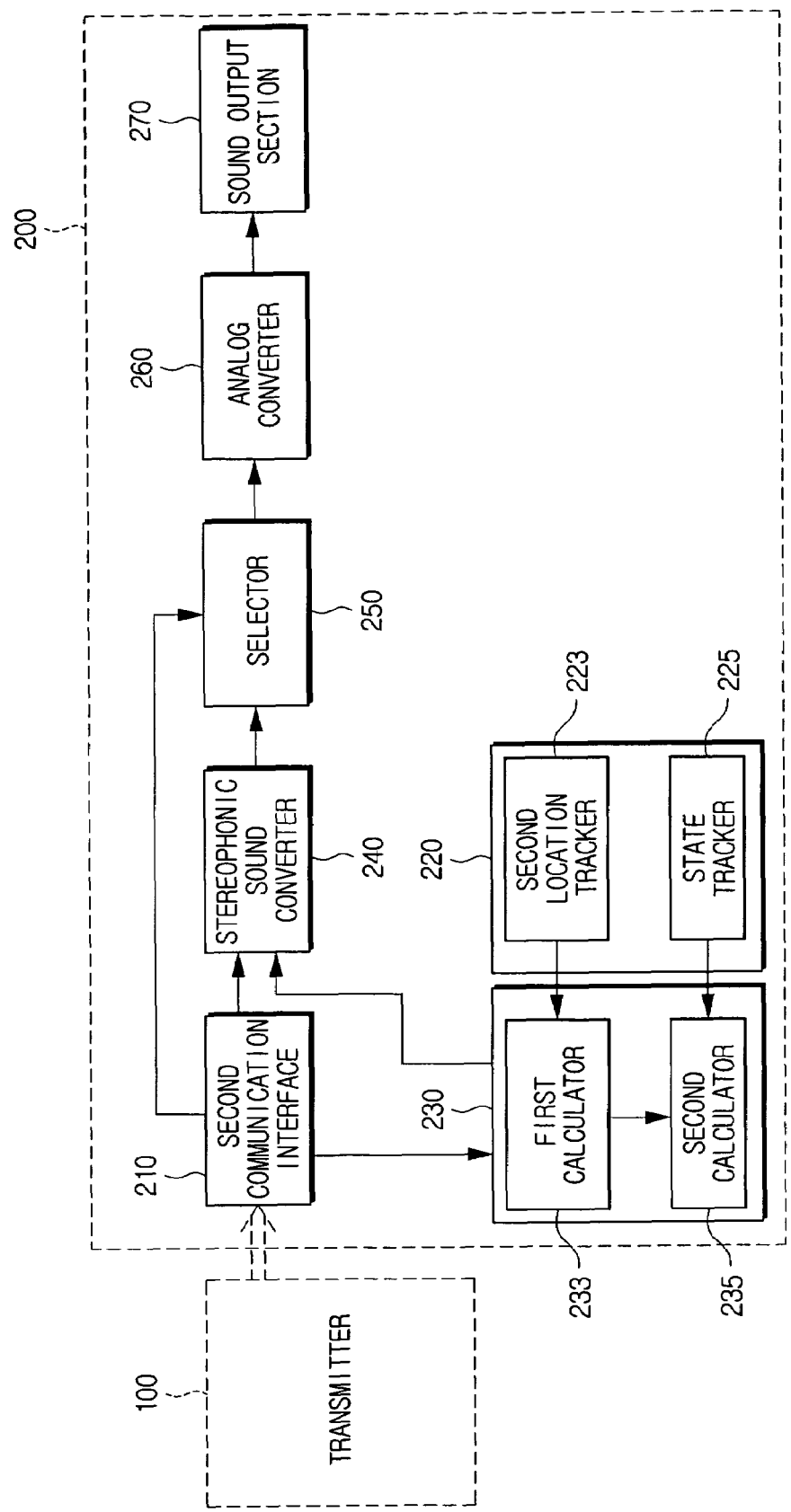
FIG. 2 is a block diagram of a receiver of the location recognition system using the stereophonic sound according to a non-limiting embodiment of the present invention.

FIG. 2 is a block diagram of a receiver of the location recognition system using the stereophonic sound according to a non-limiting embodiment of the present invention.

Referring to both FIG. 1 and FIG. 2, the location recognition system includes the transmitter 100 and the receiver 200. The receiver 200 includes a second communication interface 210, a location and state tracker 220, a relative location calculator 230, a stereophonic sound converter 240, a selector 250, an analog converter 260, and a sound output section 270.

The receiver 200 is attached to the user or placed in the vicinity of the user to receive the location tracking information and the acoustic data relating to the object from the transmitter 100. For example, the receiver 200 may be a headset which can output a surround stereophonic sound.

The second communication interface 210 is responsible to interface with the transmitter 100. The second communication interface 210 receives the acoustic data and the location tracking information from the first communication interface 130.

The location and state tracker 220 detects a location of the receiver 200 and generates location information of the receiver 200. The location and state tracker 220 includes a second location tracker 223 and a state tracker 225.

The second location tracker 223 detects the location of the receiver 200 and generates the location information of the receiver 200. The state tracker 225 generates angle information of the receiver 200 based on the object.

In more detail, when the transmitter 100 and the receiver 200 face each other, back up to each other, or face toward the same direction at a distance, the sound received by the receiver 200 varies according to the angle of the receiver 200 with respect to the transmitter 100. In this regard, the state tracker 225 is provided in the location recognition system according to a non-limiting embodiment of the present invention for the sake of the accurate recognition of the object location by taking account of particular situations where the sound varies according to the angle.

The location and state tracker 220, similar to the first location tracker 140 of the transmitter 100, requires location tracking means. For this, a location sensor may be equipped to receive the location information of the user from the GPS satellites to thus detect the location of the transmitter 100.

According to a non-limiting embodiment of the present invention, the receiver 200 of the location recognition system may be mobile devices of wide range which can be equipped with location tracking means such as GPS, including digital cameras, video cameras, cellular phones, PCSs, PDAs and the like.

The relative location calculator 230 computes a relative location and state value of the receiver 200 with respect to the object based on the location information generated by the location and state tracker 220. The relative location calculator 230 includes a first calculator 233 and a second calculator 235.

The first calculator 233 computes a relative location value of the receiver 200 with respect to the transmitter 100 based on the location tracking information relating to the object generated by the first location tracker 140 and the location information relating to the receiver generated by the second location tracker 223.

The relative location value computed by the first calculator 233 is coordinates (x, y, z) of the receiver 200 in a three-dimensional coordinate system. In the three-dimensional coordinate system, the origin (0, 0, 0) locates the transmitter 100 which is attached to or placed in the vicinity of the object. Accordingly, when the relative location value is obtained by the first calculator 233, the relative location of the receiver 200 can be acquired based on the transmitter 100.

The second calculator 235 corrects the relative location value based on the relative location computed by the first calculator 233 and the information relating to the angle generated by the state tracker 225. The corrected relative location value is referred to as a relative location and state value. Based on the situation where the transmitter 100 and the receiver 200 face each other, the relative location value is corrected when the angle changes. It should be appreciated that the relative location value can be corrected based on situations where the transmitter 100 and the receiver 200 have other location relationships.

The stereophonic sound converter 240 converts the acoustic data to stereophonic sound digital data so that the location of the object can be recognized based on the relative location and state value computed by the relative location calculator 230.

The stereophonic sound digital data converted by the stereophonic sound converter 240, should be closest to the original acoustic data for true sound quality so that the user can immediately recognize the location of the object. For example, a surround system using surround channels can be adapted.

In a typical stereophonic system, the movement of the sound is two-dimensional since the sound is output only from the left and right speakers. In comparison, the surround system is three-dimensional since music or acoustic effects are delivered to the user through speakers placed on the left and right sides and surrounding the user. Surround systems most frequently used are Dolby Surround and Dolby Pro-Logic.

Hence, the sound output section 270, which will be explained below, is a speaker having the surround function. When a headset is employed as the sound output section 270, the headset should support the surround function.

The selector 250 selects whether to convert the acoustic data received from the first communication interface 130 of the transmitter 100 to the stereophonic sound digital data at the stereophonic sound converter 240. When the user does not want to use the stereophonic sound function, the conversion is not performed. When the user wants to use the stereophonic sound function, the selector 250 selects the stereophonic sound function. Accordingly, the acoustic data received from the first communication interface 130 is converted to the stereophonic sound digital data at the stereophonic sound converter 240.

The analog converter 260 converts the stereophonic sound digital data which has been converted at the stereophonic sound converter 240, to an analog electrical signal.

The sound output section 270 outputs the converted analog electrical signal as the stereophonic sound. As mentioned above, the sound output section 270 may be a speaker or a headset which can output the stereophonic sound. For example, the sound output section 270 may be a surround speaker or a surround headset.

By employing the sound output section 270 having the surround function, the transmitter 100 to be communicated or the user having the receiver 200 can immediately recognize the their locations in the congested area by hearing the surround sound. Even if the object is a living being, its location can be immediately recognized by hearing the surround sound generated to indicate the object.

The location recognition system as explained earlier can be efficiently utilized for mutual communications between the transmitter 100 and the receiver 200 in a congested area by outputting the stereophonic sound so that the user can acquire the relative location of the receiver 200 with respect to the transmitter 100 and immediately perceive the location of the transmitter 100.

FIG. 3 is a flowchart outlining a transmission operation of a location recognition method using the stereophonic sound according to a non-limiting embodiment of the present invention.

Referring now to FIGS. 1 through 3, the sound detector 110 detects the sound of the object (S310). The detected sound is generated directly by the object, or the sound indicating the object is created by the sound detector 110.

The sound detection by the sound detector 110 may be, for example, sound capture using a microphone.

The detected sound is converted to the electrical signal by the sound detector 110 (S320).

Next, the data converter 120 converts the electrical signal to the acoustic data (S330). The electrical signal is converted to the acoustic data using various data being stored.

The first location tracker 140 detects the location of the object (S340). Certain means is required in order to detect the location of the object. For this, by way of example, a location sensor may be employed to receive location information from GPS satellites.

Next, the first communication interface 130 transmits the acoustic data and the location tracking information of the object (S350). The transmitted acoustic has been converted by the data converter 120, and the transmitted location tracking information of the object has been generated by the first location tracker 140.

FIG. 4 is a flowchart outlining a reception operation of the location recognition method using the stereophonic sound according to a non-limiting embodiment of the present invention.

Referring to FIGS. 1 through 4, the second communication interface 210 receives the acoustic data and the location tracking information of the object which are transmitted as explained in FIG. 3 (S410).

The acoustic data and the location tracking information of the object, both received by the second communication interface 210, are separated into data indicating sound and data indicating location (S420).

The relative location calculator 230 computes the relative location value based on the location tracking information of the object and the location information of the receiver 200 (S430).

The location information of the receiver 200 is detected by the second location tracker 223. The relative location value computed based on the location information of the receiver 200 is the three-dimensional coordinates (x, y, z) indicating the location of the receiver 200 based on the origin (0, 0, 0) being the location of the transmitter 100.

Next, the second calculator 235 corrects the computed relative location value based on the relative location value and the angle information of the receiver 235 (S440). The corrected relative location value is referred to as the relative location and state value.

The angle information of the receiver 200 denotes the angle of the receiver 200 with respect to the transmitter 100. The angle is detected by the state tracker 225. Even if the transmitter 100 is away from the receiver 200 at a certain distance, when the angle of the receiver 200 with respect to the transmitter 100 varies, the sound of the transmitter 100 is differently heard by the receiver 200. By taking account of such cases, the accurate location of the object can be recognized. Next, the selector 250 selects whether to use the stereophonic sound conversion function (S450). The selector 250 makes such a selection because the user may want to or not to use the stereophonic sound conversion function as discussed earlier.

When the selector 250 selects the stereophonic sound conversion function (S450-Y), the acoustic data is converted to the stereophonic sound digital data by the stereophonic sound converter 240 (S460).

The stereophonic sound digital data is converted by applying the relative location and state value computed by the relative location calculator 230 to the acoustic data received at the second communication interface 210. As a result, the stereophonic sound is produced to allow the user to immediately perceive the location of the object upon hearing the stereophonic sound. The analog converter 260 converts the stereophonic sound digital data to the analog signal (S470).

Finally, the sound output section 270 outputs the stereophonic sound (S480). The output stereophonic sound is a surround stereophonic sound so that the user can promptly perceive the location of the object. To this end, the sound output section 270 may be, by way of example, a speaker which can output the surround stereophonic sound or a headset supporting the surround function.

As described above, the location recognition method acquires the relative location of the user with respect to the object and outputs the stereophonic sound through which the user can immediately recognize the location of the object. Hence, the location recognition method can be efficiently adapted for mutual communications in a congested area.

As set forth above, the location recognition system using the stereophonic sound, the transmitter and the receiver of the location recognition system, and the location recognition method according to non-limiting embodiments of the present invention, allow the user to immediately recognize the location of the transmitter which transmits the location tracking information, and outputs stereophonic sound taking account of the relative location and angle of the receiver which receives the location information of the transmitter. Therefore, mutual communications between the transmitter and the receiver can be smoothly carried out.

While the present invention has been particularly shown and described with reference to exemplary, non-limiting embodiments thereof, it will be understood by those skilled in the art that various changes in form and details may be made therein without departing from the spirit and scope of the invention as defined by the appended claims.

What is claimed is:

1. A transmitter in a location recognition system using stereophonic sound, the transmitter comprising:
    a sound detector operative to detect a sound of an object and operative to convert the detected sound to an electrical signal;
    a data converter operative to convert the electrical signal converted by the sound detector, to acoustic data; and
    a first communication interface operative to transmit the acoustic data converted by the data converter and location tracking information to a receiver.

2. The transmitter of claim 1, wherein the transmitter is attached to the object or is placed in a vicinity of the object.

3. The transmitter of claim 1, further comprising:
    a first location tracker which detects a location of the transmitter and generates the location tracking information of the transmitter.

4. The transmitter of claim 1, wherein the sound detector detects a sound generated by the object and converts the detected sound to an electrical signal.

5. The transmitter of claim 1, wherein the sound detector creates a sound indicating the object and converts the created sound to an electrical signal.

6. The transmitter of claim 1, wherein the sound detector is a microphone.

7. A receiver in a location recognition system which uses a stereophonic sound and includes a transmitter transmitting location tracking information of an object and the receiver receiving the location tracking information, the receiver comprising:
    a location and state tracker which generates location information of the receiver by detecting a location of the receiver;
    a relative location calculator which computes a relative location and state value of the receiver with respect to the transmitter based on the location information generated by the location and state tracker;
    a stereophonic sound converter which converts acoustic data to stereophonic sound digital data to inform a location of the transmitter based on the relative location and state value computed by the relative location calculator;
    an analog converter which converts the stereophonic sound digital data converted by the stereophonic sound converter, to an analog signal; and
    a sound output section which outputs the analog signal converted by the analog converter as a sound.

8. The receiver of claim 7, wherein the receiver is attached to a user or is placed in a vicinity of the user.

9. The receiver of claim 7, wherein the location and state tracker comprises:
    a second location tracker which generates location information of the receiver by detecting a location of the receiver; and
    a state tracker which generates angle information of the receiver with respect to the transmitter.

10. The receiver of claim 9, wherein the relative location calculator comprises;
    a first calculator which computes a relative location value of the receiver with respect to the transmitter based on location tracking information of the transmitter and the location information of the receiver generated by the location tracker; and
    a second calculator which corrects the relative location value based on the relative location value and the angle information.

11. The receiver of claim 10, wherein the first calculator computes coordinates (x, y, z) which is the relative location value of the receiver, in a three-dimensional coordinate system having an origin (0, 0, 0) as the transmitter.

12. The receiver of claim 10, wherein the second calculator corrects the relative location value when the transmitter and the receiver face each other and an angle between the transmitter and the receiver changes.

13. The receiver of claim 10, wherein the stereophonic sound converter converts the acoustic data received from a first communication interface of the transmitter by applying the relative location and state value.

14. The receiver of claim 7, wherein the stereophonic sound digital data converted by the stereophonic sound converter is surround stereophonic sound digital data.

15. The receiver of claim 7, further comprising:
    a second communication interface which receives the acoustic data and location tracking information of an object from a first communication interface of the transmitter.

16. The receiver of claim 7, further comprising:
    a selector which selects whether to convert the received acoustic data to the stereophonic sound digital data.

17. A location recognition system using stereophonic sound, comprising:

a transmitter which transmits location tracking information of an object; and a receiver which receives the location tracking information, wherein the transmitter comprises:

a sound detector which detects a sound of the object and operative to convert the detected sound to an electrical signal;

a data converter operative to convert the electrical signal converted by the sound detector, to acoustic data; and a first communication interface operative to transmit the acoustic data converted by the data converter and the location tracking information to the receiver.

18. The location recognition system of claim 17, wherein the receiver comprises:

a location and state tracker operative to generate location information of the receiver by detecting a location of the receiver;

a relative location calculator operative to compute a relative location and state value of the receiver with respect to the transmitter based on the location information generated by the location and state tracker;

a stereophonic sound converter operative to convert the acoustic data to stereophonic sound digital data to inform the location of the transmitter based on the relative location and state value computed by the relative location calculator;

an analog converter operative to convert the stereophonic sound digital data converted by the stereophonic sound converter, to an analog signal; and a sound output section operative to output the analog signal converted by the analog converter as a sound.

19. A location recognition method using a stereophonic sound comprising:

transmitting location tracking information of an object; and receiving the location tracking information, wherein the transmitting of the location tracking information comprises:

detecting a sound of the object and converting the detected sound to an electrical signal;

converting the converted electrical signal to acoustic data; and transmitting the converted acoustic data and the location tracking information.

20. The location recognition method of claim 19, wherein the transmitting of the location tracking information further comprises:

generating the location tracking information by detecting a location of the object.

21. The location recognition method of claim 19, wherein the receiving of the location tracking information comprises:

receiving the acoustic data and the location tracking information of the object;

separating the acoustic data and the location tracking information into data relating to the sound and data relating to the location information;

computing a relative location value of a receiver with respect to the object based on the location tracking information of the object and information of the receiver which receives the location tracking information;

correcting the relative location value based on the relative location value and angle information of the receiver;

converting the acoustic data to stereophonic sound digital data based on the corrected relative location value;

converting the converted stereophonic sound digital data to an analog signal; and outputting the converted analog signal as a sound.

22. The location recognition method of claim 21, wherein the receiving of the location tracking information further comprises:

selecting a function which converts the received acoustic data to the stereophonic sound digital data.

* * * * *